United States Patent [19]
Jiasheng et al.

[11] Patent Number: 5,406,506
[45] Date of Patent: Apr. 11, 1995

[54] DOMINO ADDER CIRCUIT HAVING MOS TRANSISTORS IN THE CARRY EVALUATING PATHS

[75] Inventors: Xu Jiasheng; Wang Yueming, both of Beijing, China

[73] Assignee: United Microelectronics Corp., Hsin-Chu, Taiwan, Prov. of China

[21] Appl. No.: 149,606

[22] Filed: Nov. 9, 1993

[51] Int. Cl.$^6$ .............................................. G06F 7/50
[52] U.S. Cl. .................................................... 364/784
[58] Field of Search ................................ 364/784–788; 307/452, 451, 448

[56] References Cited

U.S. PATENT DOCUMENTS

| | | | |
|---|---|---|---|
| 4,733,365 | 3/1988 | Nagamatsu | 364/784 |
| 4,851,714 | 7/1989 | Hwang | 307/448 |
| 4,896,057 | 1/1990 | Yang et al. | 307/448 |
| 4,899,305 | 2/1990 | Needles | 364/787 |
| 5,128,892 | 7/1992 | Ullrich | 364/786 |
| 5,132,921 | 7/1992 | Kelley et al. | 364/784 |

Primary Examiner—Tan V. Mai
Attorney, Agent, or Firm—Ladas & Parry

[57] ABSTRACT

An improved Domino adder circuit has a carry evaluating logic, including a precharge transistor, an evaluation transistor, and three carry evaluating paths connected the precharge and evaluation transistors, and constituted by five N-channel Metal Oxide Silicon "NMOS" transistors which are connected to and controlled by three input signals respectively. The carry evaluating logic has a carry evaluating point positioned at the top of the carry evaluating paths. The improved Domino adder circuit further has a sum evaluating logic, including a precharge transistor, an evaluation transistor, and four sum evaluating paths connected between the precharge and evaluation transistors, and connected to and controlled by the three input signals respectively. The sum evaluating logic has a sum evaluating point at the top of the sum evaluating paths. A carry generating logic is connected to and controlled by the carry evaluating point to generate a carry output signal, and a sum generating logic is connected to and controlled by the sum evaluating point to generate a sum output signal.

6 Claims, 3 Drawing Sheets

| INPUT SIGNALS | | | STATES OF TRANSISTORS | | | | | | | | | | NODE 8 | SUM |
|---|---|---|---|---|---|---|---|---|---|---|---|---|---|---|
| X | Y | Z | $T_1$ | $T_2$ | $T_3$ | $T_4$ | $T_5$ | $T_6$ | $T_7$ | $T_8$ | $T_9$ | $T_{10}$ | $V_8$ | $S_0$ |
| 0 | 0 | 0 | ON | ON | OFF | ON | ON | ON | OFF | OFF | OFF | OFF | HIGH | 0 |
| 0 | 0 | 1 | ON | ON | OFF | OFF | OFF | OFF | ON | ON | OFF | OFF | LOW | 1 |
| 0 | 1 | 0 | ON | OFF | ON | OFF | ON | ON | OFF | OFF | ON | OFF | LOW | 1 |
| 0 | 1 | 1 | ON | OFF | ON | OFF | OFF | OFF | ON | ON | ON | OFF | HIGH | 0 |
| 1 | 0 | 0 | OFF | ON | OFF | ON | ON | ON | OFF | OFF | OFF | ON | LOW | 1 |
| 1 | 0 | 1 | OFF | ON | OFF | OFF | OFF | OFF | ON | ON | OFF | ON | HIGH | 0 |
| 1 | 1 | 0 | OFF | OFF | ON | OFF | ON | ON | OFF | ON | ON | ON | HIGH | 0 |
| 1 | 1 | 1 | OFF | OFF | ON | OFF | OFF | OFF | ON | ON | ON | ON | LOW | 1 |

FIG. 3b

DOMINO ADDER CIRCUIT HAVING MOS TRANSISTORS IN THE CARRY EVALUATING PATHS

BACKGROUND OF THE INVENTION

The present invention relates to an improved Domino adder circuit.

Domino adders are the well-known carry-save adders (CAS) which are also often referred to as full adders or 3:2 adders. Domino circuits are a dynamic CMOS (Complementary Metal-Oxide-Semiconductor) circuit which must be controlled by clocks. As known in this art, Domino adders are very suitable for use in pipelined multipliers which are one of the basic building blocks of digital signal processing hardware. A standard Domino adder is schematically shown in FIG. 1. The Domino adder includes a carry evaluating logic 12, a sum evaluating logic 16, a carry generating logic 14, and a sum generating logic 18. The carry evaluating logic 12 includes a PMOS (P-channel Metal-Oxide-Semiconductor) evaluation transistor $Q_{20}$, an NMOS (N-channel MOS) pre-discharge transistor $Q_{21}$, and three carry evaluating paths connected between the transistors $Q_{20}$ and $Q_{21}$. The evaluation and pre-discharge transistors $Q_{20}$ and $Q_{21}$ are controlled by clock $\bar{\phi}$. The three carry evaluating paths are constituted by five PMOS transistors $Q_1$ through $Q_5$. The first carry evaluating path is constituted by the transistors $Q_1$ and $Q_3$, which are connected in series and controlled by input signals Y and Z respectively. The second carry evaluating path is constituted by the transistors $Q_2$ and $Q_3$, which are connected in series and controlled by input signals X and Z respectively. The third carry evaluating path is constituted by the transistors $Q_4$ and $Q_5$, which are connected in series and controlled by input signals X and Y respectively. The carry generating logic 14 is controlled by the clock $\bar{\phi}$ and a node or carry evaluating point 5 of the carry evaluating logic 12, positioned at the bottom of the carry evaluating paths.

The sum evaluating logic 16 includes a PMOS precharge transistor $Q_{22}$, an NMOS evaluation transistor $Q_{23}$, and four sum evaluating paths connected between the transistors $Q_{22}$ and $Q_{23}$ The precharge and evaluation transistors $Q_{22}$ and $Q_{23}$ are controlled by clock $\phi$. The four sum evaluating paths are constituted by seven NMOS transistors $Q_6$ through $Q_2$. The first sum evaluating path is constituted by the transistors $Q_6$ and $Q_9$ which are connected in series and controlled by input signal Z and node 5 respectively. The second sum evaluating path is constituted by the transistors $Q_7$ and $Q_9$, which are connected in series and controlled by input signal Y and node 5 respectively. The third sum evaluating path is constituted by the transistors $Q_8$ and $Q_9$, which are connected in series and controlled by input signal X and node 5 respectively. The fourth sum evaluating path is constituted by the transistors $Q_{10}$ through $Q_{12}$, which are connected in series and controlled by input signals X, Y, and Z respectively. The sum generating logic 18 is controlled by the clock $\phi$ and a node or sum evaluating point 6 of the sum evaluating logic 16, positioned at the top of the sum evaluating paths.

The operations of the Domino adder include a precharge phase and an evaluation phase. During the precharge phase, clock $\phi$ is at a low voltage level while clock $\bar{\phi}$ is at a high voltage level. Transistors $Q_{22}$ and $Q_{21}$ are turned on while transistors $Q_{23}$ and $Q_{20}$ are turned off. The node 5 of the carry evaluating logic 12 is discharged to a low voltage level, i.e. ground (GND), and the node 6 of the sum evaluating logic 16 is precharged to a high voltage level, i.e. the power supply voltage $V_{cc}$. During the evaluation phase, clock $\phi$ is at a high voltage level while clock $\bar{\phi}$ is at a low voltage level. Transistors $Q_{23}$ and $Q_{20}$ are turned on while transistors $Q_{22}$ and $Q_{21}$ are turned off. The voltage level of node 5 depends on the three input signals X, Y, and Z, and is charged to "HIGH" only if two or all input signals are binary "0". If the node 5 is at level of node 5 depends on the three input signals X, Y, and Z, and is charged to "HIGH" only if two or all input signals are binary "0". If the node 5 is at "HIGH", the output $C_o$ of the carry generating logic 14 is "0", i.e. no carry bit is generated. The node 5 is kept at "LOW" if two or all input signals are binary "1". In such a case, the output $C_o$ of the carry generating logic 14 is "1", i.e. carry is generated. During the evaluation phase, the voltage level of node 6 depends on not only the three input signals X, Y, and Z, but also the state of node 5. If three input signals X, Y, and Z are all "1", the fourth sum evaluating path constituted by transistors $Q_{10}$ through $Q_{12}$ is "ON", and the node 6 is discharged to ground. Thus, the output $S_o$ of the sum generating logic 18 is "1". If two input signals are "1" and one is "0", the node 5 is at "LOW" to turn off the transistor $Q_9$, and the first through fourth sum evaluating paths are all "OFF", so that the node 6 is kept at "HIGH". Thus, the output $S_o$ of the sum generating logic 18 is "0". If one input signal is "1" and two are "0", the node 5 is charged to "HIGH" to turn on the transistor $Q_9$, and one of the first through third sum evaluating paths is "ON", so that the node 6 is discharged to ground. Thus, the output $S_o$ of the sum generating logic 18 is "1". In this case, the delay time of sum evaluation is the largest case because the sum $S_o$ is correctly generated only after the node 5 of the carry evaluating logic 12 is charged to "HIGH" to turn on the transistor $Q_9$. If three input signals X, Y, and Z are all "0", all sum evaluating paths are "OFF", so that the node 6 is kept at "HIGH". Thus, the output $S_o$ of the sum generating logic 18 is "0".

As shown in FIG. 1, a standard Domino adder utilizes PMOS transistors $Q_1$ through $Q_5$ to constitute the carry evaluating paths. As known in this art, the operation speed of PMOS transistors is two-three times lower than that of NMOS transistors due to the carrier mobility difference. Thus, the PMOS transistors $Q_1$ through $Q_5$ significantly affect the carry evaluation speed of Domino adder. Furthermore, since the sum evaluation has to await the carry evaluation in a standard Domino adder, the operation speed of the Domino adder is further lowered.

SUMMARY OF THE INVENTION

The primary object of the present invention is to provide an improved Domino adder circuit which utilizes NMOS transistors to constitute the carry evaluating paths, so that the carry evaluation speed is increased.

Another object of the present invention is to provide an improved Domino adder circuit wherein its carry evaluating logic and sum evaluating logic are operated individually, so that entire operation speed of the adder is significantly increased.

In accordance with the present invention, an improved Domino adder circuit comprises:

a carry evaluating logic including a first precharge transistor, a first evaluation transistor, and three carry, evaluating paths connected between the first precharge and evaluation transistors and constituted by five NMOS transistors which are connected to and controlled by three input signals respectively, the carry evaluating logic having a carry evaluating point positioned at the top of the carry evaluating paths;

a sum evaluating logic including a second precharge transistor, a second evaluation transistor, and four sum evaluating paths connected between the second precharge and evaluation transistors, and connected to and controlled by the three input signals respectively, the sum evaluating logic having a sum evaluating point at the top of the sum evaluating paths;

a carry generating logic connected to and controlled by the carry evaluating point to generate a carry output signal; and a sum generating logic connected to and controlled by the sum evaluating point to generate a sum output signal.

In accordance with one aspect of the present invention, each carry evaluating path of the carry evaluating logic is constituted by two serially-connected NMOS transistors which are controlled by two of the three input signals respectively.

In accordance with another aspect of the present invention, the sum evaluating logic is coupled to and controlled by the carry evaluating point. The sum evaluating logic further includes a pull-up transistor connected to the top of the sum evaluating paths, and controlled by the carry evaluating point.

In accordance with yet another aspect of the present invention, the first and second precharge transistors are PMOS transistors, and are controlled by a clock. The first and second evaluation transistors are NMOS transistors, and are controlled by the clock. The sum evaluating paths is connected to and controlled by the three input signals and the inverted input signals.

BRIEF DESCRIPTION OF THE DRAWINGS

The present invention can be more fully understood by reference to the following description and accompanying drawings, which form an integral part of this application:

FIG. 3b is a table illustrating the relationship between input signals and transistor states of the sum evaluating paths in the improved Domino adder as shown in FIG. 3a.

DETAILED DESCRIPTION OF THE PREFERRED EMBODIMENTS

Figure 1:
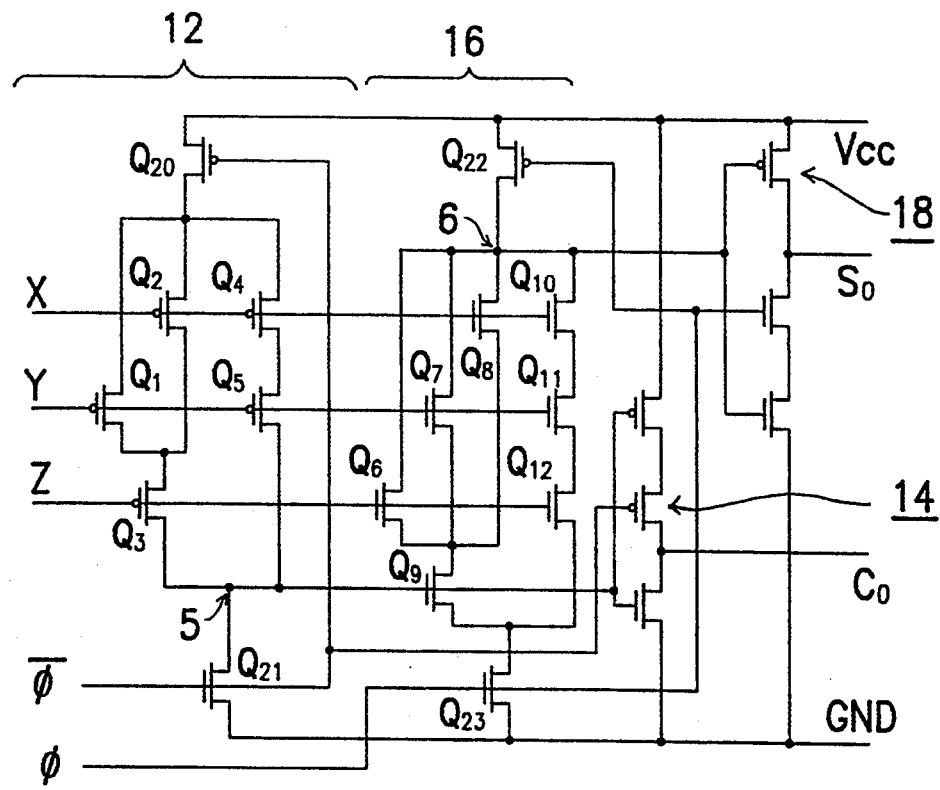
FIG. 1 is an electrical circuit schematic diagram of a standard Domino adder.
Figure 2:
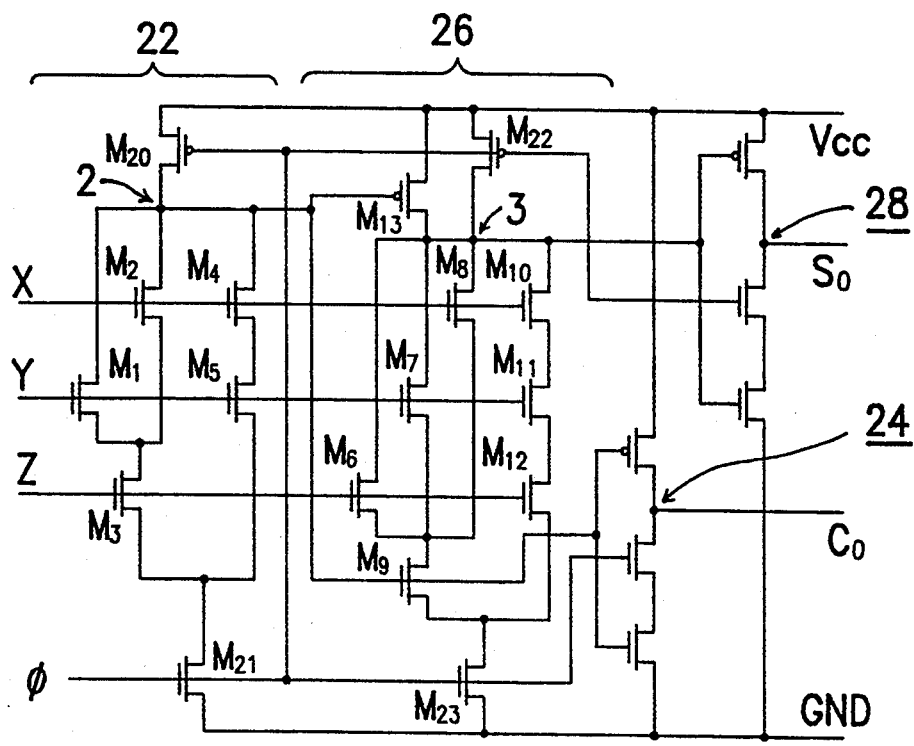
FIG. 2 is an electrical circuit schematic diagram of an improved Domino adder according to the first preferred embodiment of the present invention.

Referring now to FIG. 2, there is shown an improved Domino adder circuit according to the first preferred embodiment of the present invention. The improved Domino adder circuit includes a carry evaluating logic 22, a sum evaluating logic 26, a carry generating logic 24 coupled to the carry evaluating logic 22, and a sum generating logic 28 coupled to the sum evaluating logic 26. The carry evaluating logic 22 includes a PMOS precharge transistor $M_{20}$, an NMOS evaluation transistor $M_{21}$, and three carry evaluating paths connected between the transistors $M_{20}$ and $M_{21}$. The precharge transistor $M_{20}$ is controlled by clock $\phi$, and has a source electrode connected to a power supply voltage $V_{cc}$ and a drain electrode connected to the top of the carry evaluating paths. The evaluation transistor $M_{21}$ is controlled by clock $\phi$, and has a drain electrode connected to the bottom of the carry evaluating paths and a source electrode connected to the ground GND. The three carry evaluating paths are constituted by five NMOS transistors $M_1$ through $M_5$. The first carry evaluating path is constituted by the transistors $M_1$ and $M_3$, which are connected in series and controlled by input signals Y and Z respectively. The second carry evaluating path is constituted by the transistors $M_2$ and $M_3$, which are connected in series and controlled by input signals X and Z respectively. The third carry evaluating path is constituted by the transistors $M_4$ and $M_5$, which are connected in series and controlled by input signals X and Y respectively. The carry generating logic 24 is controlled by the clock $\phi$ and a node or carry evaluating point 2 of the carry evaluating logic 22, positioned at the top of the carry evaluating paths.

The sum evaluating logic 26 includes a PMOS precharge transistor $M_{22}$, a PMOS pull-up transistor $M_{13}$, an NMOS evaluation transistor $M_{23}$, and four sum evaluating paths connected between the transistors $M_{22}$ and $M_{23}$. The precharge transistor $M_{22}$ is controlled by clock $\phi$, and has a source electrode connected to the power supply voltage $V_{cc}$, and a drain electrode connected to the top of the sum evaluating paths. The pull-up transistor $M_{13}$ is controlled by the carry evaluating point or node 2 of the carry evaluating logic 22, and has a source electrode connected to the power supply voltage $V_{cc}$, and a drain electrode connected to the top of the sum evaluating paths. The evaluation transistor $M_{23}$ is controlled by clock $\phi$, and has a drain electrode connected to the bottom of the sum evaluating paths and a source electrode connected to the ground GND. The four sum evaluating paths are constituted by seven NMOS transistors $M_6$ through $M_{12}$. The first sum evaluating path is constituted by the transistors $M_6$ and $M_9$, which are connected in series and controlled by input signal Z and node 2 respectively. The second sum evaluating path is constituted by the transistors $M_7$ and $M_9$, which are connected in series and controlled by input signal Y and node 2 respectively. The third sum evaluating path is constituted by the transistors $M_8$ and $M_9$, which are connected in series and controlled by input signal X and node 2 respectively. The fourth sum evaluating path is constituted by the transistors $M_{10}$ through $M_{12}$, which are connected in series and controlled by input signals X, Y, and Z respectively. The sum generating logic 28 is controlled by the clock $\phi$ and a node or sum evaluating point 3 of the sum evaluating logic 26, positioned at the top of the sum evaluating paths.

The main difference between the improved and standard Domino adders is that the improved Domino adder utilizes five NMOS, not PMOS, transistors $M_1$ through $M_5$ to constitute the carry evaluating paths. The carry evaluating point 2 of the present invention is positioned at the top, not the bottom as in conventional Domino adder, of the carry evaluating paths. The transistors $M_{20}$ and $M_{21}$ in the carry evaluating logic 22 of the present invention are controlled by clock $\phi$, while the counterparts $Q_{20}$ and $Q_{21}$ in the carry evaluating logic 12 of standard Domino adder are controlled by clock $\bar{\phi}$. The pull-up transistor $M_{13}$ is further added to the improved Domino adder to avoid a signal race problem. This will be described in detail below.

The operations of the improved Domino adder also include a precharge phase and an evaluation phase. During the precharge phase, clock $\phi$ is at a low voltage level, and thus the precharge transistors $M_{20}$ and $M_{22}$ are turned on while the evaluation transistors $M_{21}$ and $M_{23}$ are turned off. The nodes 2 and 3 of the carry and sum evaluating logics 22 and 26 are precharged to a high voltage level, i.e. the power supply voltage $V_{cc}$. During the evaluation phase, clock $\phi$ is at a high voltage level, and thus the evaluation transistors $M_{21}$ and $M_{23}$ are turned on while the precharge transistors $M_{20}$ and $M_{22}$ are turned off. The voltage level of node 2 depends on the three input signals X, Y, and Z, and is kept at "HIGH" only if two or all input signals are binary "0". If the node 2 is at "HIGH", the output $C_o$ of the carry generating logic 24 is "0", i.e. no carry, bit is generated. The node 2 is discharged to "LOW" if two or all input signals are binary "1". In such a case, the output $C_o$ of the carry generating logic 24 is "1", i.e. carry is generated. During the evaluation phase, the voltage level of node 3 depends on not only the three input signals X, Y, and Z, but also the state of node 2. If three input signals X, Y, and Z are all "1", the fourth sum evaluating path constituted by transistors $M_{10}$ through $M_{12}$ is "ON", and the node 3 is discharged to ground. Thus, the output $S_o$ of the sum generating logic 28 is "1". If two input signals are "1" and one is "0", the node 2 is discharged to "LOW" to turn off the transistor $M_9$, and the first through fourth sum evaluating paths are all "OFF", so that the node 3 is kept at "HIGH". Thus, the output $S_o$ of the sum generating logic 28 is "0". If one input signal is "1" and two are "0", the node 2 is kept at "HIGH" to turn on the transistor $M_9$, and one of the first through third sum evaluating paths is "ON", so that the node 3 is discharged to ground. Thus, the output $S_o$ of the sum generating logic 28 is "1". If the three input signals X, Y, and Z are all "0", all sum evaluating paths are "OFF", so that the node 3 is kept at "HIGH". Thus, the output $S_o$ of the sum generating logic 28 is "0".

From above description, it is evident that the improved Domino adder circuit can achieve the same full adder function as the standard Domino adder. Since the improved Domino adder uses NMOS transistors $M_1$ through $M_5$ to constitute the carry evaluating paths, the carry evaluation speed can be significantly increased, and the sum evaluation almost does not need to await the carry evaluation. However, a signal race problem should be taken into consideration in the improved Domino adder circuit of FIG. 2. For example, when two input signals are "1" and one is "0", the node 2 should be discharged to "LOW", and the node 3 should be kept at "HIGH". Due to signal race, the transistor $M_9$ may not be turned off during the discharging of node 2. In such a case, node 3 may be discharged incorrectly, and is not kept at the "HIGH" level. In order to avoid this signal race problem, the node 2 is required to be discharged rapidly. The discharging of node 3 is required to be delayed adequately, and charges should be supplemented to the node 3. There are three approaches to achieving these purposes in the present invention. First, the sizes of transistors $M_1$ through $M_5$ in the carry evaluating paths are increased to facilitate the discharging of node 2. Second, the size of transistor $M_9$ is adequately decreased to delay the discharging of node 3. Third, the pull-up transistor $M_{13}$ is connected to the node 3 to pull up the voltage level of node 3 when two input signals are "1" and one is "0". However, the size of transistor $M_{13}$ should be adequately selected so as not to affect the discharging of node 3 when three input signals are all "1". In 2 $\mu$m CMOS technique, the preferred width/length of transistors $M_1$ through $M_5$ is 6 $\mu$m/2 $\mu$m, and the preferred width/length of transistors $M_9$ and $M_{13}$ is 3 $\mu$m/2 $\mu$m.

Figure 3A:
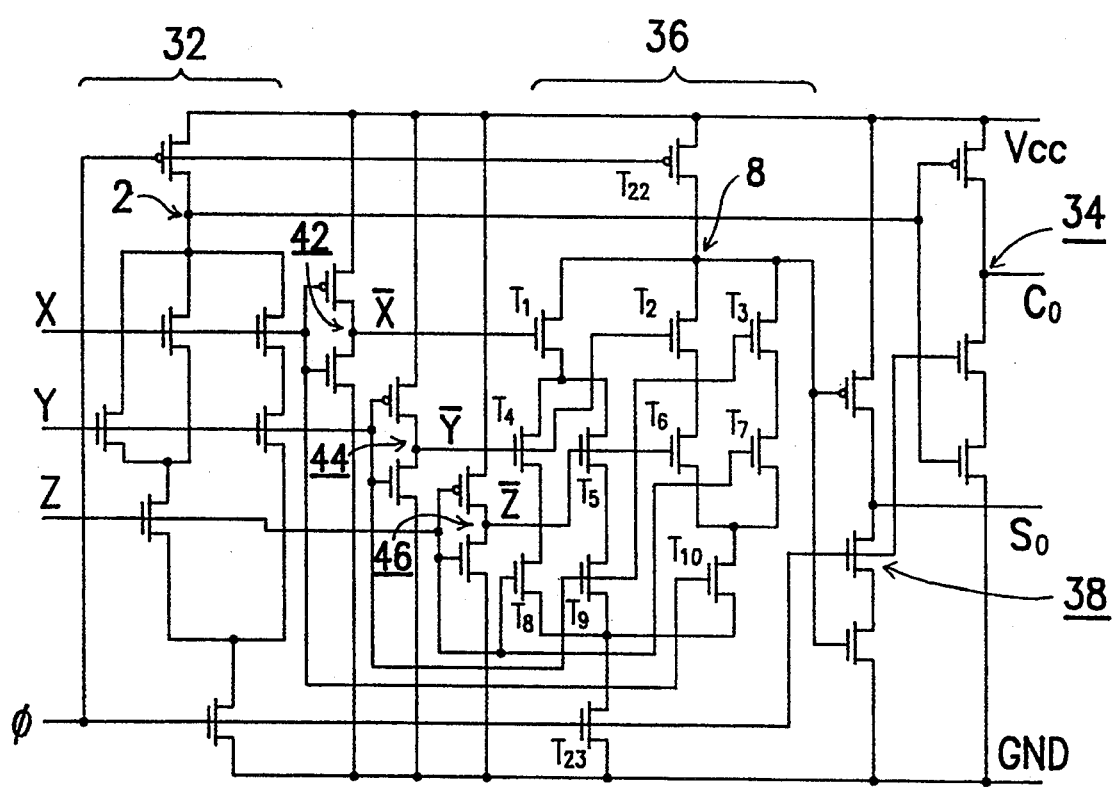
FIG. 3a is an electrical circuit schematic diagram of an improved Domino adder according to the second preferred embodiment of the present invention.

Referring to FIG. 3a, there is shown an improved Domino adder circuit according to the second preferred embodiment of the present invention. The improved Domino adder circuit of this embodiment includes a carry evaluating logic 32, a sum evaluating logic 36, a carry generating logic 34 coupled to the carry evaluating logic 32, and a sum generating logic 38 coupled to the sum evaluating logic 36. The carry evaluating logic 32 shown in FIG. 3a is identical to the carry evaluating logic 22 shown in FIG. 2. The carry and sum generating logics 34 and 38 shown in FIG. 3a are also identical to the carry and sum generating logics 24 and 28 shown in FIG. 2, respectively, the improved Domino adder circuit of this embodiment further includes three inverters 42, 44, and 46 coupled between the power supply voltage $V_{cc}$ and ground GND, and having inputs connected to the three input signals X, Y, and Z respectively. The sum evaluating logic 36 includes a PMOS precharge transistor $T_{22}$, an NMOS evaluation transistor $T_{23}$, and four sum evaluating paths connected between the transistors $T_{22}$ and $T_{23}$. The precharge transistor $T_{22}$ is controlled by clock $\phi$, and has a source electrode connected to the power supply voltage $V_{cc}$, and a drain electrode connected to the top of the sum evaluating paths. The evaluation transistors $T_{23}$ is controlled by clock $\phi$, and has a drain electrode connected to the bottom of the sum evaluating paths, and a source electrode connected to the ground GND. The four sum evaluating paths are constituted by ten NMOS transistors $T_1$ through $T_{10}$. The first sum evaluating path is constituted by the serially-connected transistors $T_1$, $T_4$, and $T_8$. The second sum evaluating path is constituted by the serially-connected transistors $T_1$, $T_5$, and $T_9$. The third sum evaluating path is constituted by the serially-connected transistors $T_2$, $T_6$, and $T_{10}$. The fourth sum evaluating path is constituted by the serially-connected transistors $T_3$, $T_7$, and $T_{10}$. Transistor $T_{10}$ is controlled by input signal X, and transistor $T_1$ is controlled by input signal $\overline{X}$. Transistors $T_3$ and $T_9$ are controlled by input signal Y, and transistors $T_2$ and $T_4$ are controlled by input signal Y. Transistors $T_7$ and $T_8$ are controlled by input signal Z, and transistors $T_5$ and $T_6$ are controlled by input signal $\overline{Z}$. The sum generating logic 38 is controlled by the clock $\phi$ and a node or sum evaluating point 8 of the sum evaluating logic 36, positioned at the top of the sum evaluating paths.

The operations of this improved Domino adder circuit also include a precharge phase and an evaluation phase. The operations of the carry evaluating and generating logics 32 and 34 are identical to those of the carry evaluating and generating logics 22 and 24 of FIG. 2, and thus are not described again. In this embodiment, it should be noted that the operation of the sum evaluating logic 36 is independent of the operation of the carry evaluating logic 32. That is to say, the sum evaluation of the second preferred embodiment does not need to await the carry evaluation. During the precharge phase, clock $\phi$ is at a low voltage level, and thus the precharge transistor $T_{22}$ is turned on while the evaluation transistor $T_{23}$ is turned off. The node 8 of the sum evaluating logic 36 is precharged to a high voltage level, i.e. the power supply voltage $V_{cc}$. During the evaluation phase, clock $\phi$ is at a high voltage level, and thus the evaluation transistor $T_{23}$ is turned on while the precharge transistor $T_{22}$ is turned off. The voltage level of node 8 wholly depends on the three input signals X, Y, and Z. The characteristics of input signals X, Y, and Z, the transistor states of the sum evaluating paths, the voltage level of node 8, and the output $S_o$ of the sum generating logic 38 are shown in FIG. 3b to describe the operation of the sum evaluating logic 36. It should be noted that the underlined states in FIG. 3b indicate the turned-on sum evaluating paths. As shown in FIG. 3b, it is evident that the sum evaluating logic 36 can achieve a correct sum evaluation function independent of the carry evaluation. Thus, the operation speed of the second preferred embodiment is higher than that of the first preferred embodiment.

Although the second preferred embodiment further includes three inverters 42, 44, and 46, the inverters in fact will not affect the operation speed of the improved Domino adder circuit. Domino circuits require that the input signals have to be stable during the precharge phase and are kept unchanged during the evaluation phase. Therefore, when clock $\phi$ changes from the precharge phase to the evaluation phase, the input signals X, Y, and Z are passing through the inverters 42, 44, and 46. Since there is an interval of time for the rising edge of the clock $\phi$ when it changes from the precharge phase to the evaluation phase, and the delay time of each inverter is very small, the input signals have passed through the inverters 42, 44, and 46 by the time the evaluation phase begins. Thus, the sum evaluation time is not affected by the delay of inverters 42, 44, and 46.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A Domino adder circuit comprising:

a carry evaluating logic including a first precharge transistor, a first evaluation transistor, and three carry evaluating paths connected between said first precharge and evaluation transistors, comprising five NMOS transistors which are adapted to be connected to and controlled by three input signals respectively, said carry evaluating logic having a carry evaluating point connected between said first precharge transistor and said carry evaluating paths;

a sum evaluating logic including a second precharge transistor, a second evaluation transistor, and four sum evaluating paths connected between said second precharge and evaluation transistors, and controlled by the three input signals respectively, said sum evaluating logic having a sum evaluating point connected between said second precharge transistor and said sum evaluating paths;

a carry generating logic connected to and controlled by said carry evaluating point to generate a carry output signal; and a sum generating logic connected to and controlled by said sum evaluating point to generate a sum output signal.

2. A Domino adder circuit as claimed in claim 1, wherein each carry evaluating path is respectively comprises two of said five NMOS transistors, said two NMOS transistors being connected in series and being controlled by two of the three input signals respectively.

3. Domino adder circuit as claimed in claim 2, wherein said sum evaluating logic is coupled to and controlled by said carry evaluating point.

4. Domino adder circuit as claimed in claim 3, wherein said first and second precharge transistors are PMOS transistors, and are adapted to be controlled by a clock, and wherein said first and second evaluation transistors are NMOS transistors, and are adapted to be controlled by said clock.

5. Domino adder circuit as claimed in claim 4, wherein said sum evaluating paths is adapted to be connected to and controlled by the three input signals and the inverted input signals.

6. A Domino adder circuit as claimed in claim 3, wherein said sum evaluating logic further includes a PMOS pull-up transistor having a drain electrode connected to said sum evaluating point, and a gate electrode controlled by said carry evaluating point.

* * * * *